US010606116B2

(12) United States Patent
Wang et al.

(10) Patent No.: US 10,606,116 B2
(45) Date of Patent: Mar. 31, 2020

(54) DISPLAY PANEL, DISPLAY DEVICE AND MANUFACTURING METHOD THEREOF

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Xiaojun Wang, Beijing (CN); Shouzheng Wu, Beijing (CN); Xinxin Wu, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 79 days.

(21) Appl. No.: 15/992,437

(22) Filed: May 30, 2018

(65) Prior Publication Data

US 2019/0064581 A1    Feb. 28, 2019

(30) Foreign Application Priority Data

Aug. 31, 2017  (CN) .......................... 2017 1 0774145

(51) Int. Cl.
*G02F 1/153*    (2006.01)
*G02F 1/1335*   (2006.01)
(Continued)

(52) U.S. Cl.
CPC .. *G02F 1/133512* (2013.01); *G02F 1/133516* (2013.01); *G02F 1/15* (2013.01);
(Continued)

(58) Field of Classification Search
CPC ......... G02F 1/133512; G02F 1/133516; G02F 1/15; G02F 1/1533; G02F 1/155; G02F 1/157; G02F 2001/133354; G02F 2201/50
(Continued)

(56) References Cited

U.S. PATENT DOCUMENTS 9,477,019 B2    10/2016 Li et al.
2008/0002110 A1*  1/2008 Choi ................. G02F 1/133514
                                                    349/106

(Continued)

FOREIGN PATENT DOCUMENTS

CN    102707510 A    10/2012
CN    103760730 A    4/2014
CN    103913888 A    7/2014

OTHER PUBLICATIONS

Office Action dated Sep. 3, 2019 issued in corresponding in Chinese Application No. 201710774145.0.

*Primary Examiner* — William Choi
(74) *Attorney, Agent, or Firm* — Nath, Goldberg & Meyer; Joshua B. Goldberg

(57) ABSTRACT

The present disclosure provides a display panel, a display device and a manufacturing method thereof to improve an effective display region of the display panel. The display panel comprises a plurality of pixels arranged in an array, and a black matrix between every two adjacent pixels, the display panel also comprises at least one display member displaying a preset color, and each of the at least one display member is arranged on one side of the black matrix between two corresponding adjacent pixels close to a light-outgoing surface of the display panel.

20 Claims, 8 Drawing Sheets

(51) Int. Cl.
 *G02F 1/155* (2006.01)
 *G02F 1/157* (2006.01)
 *G02F 1/15* (2019.01)
 *G02F 1/1333* (2006.01)

(52) U.S. Cl.
 CPC .............. *G02F 1/155* (2013.01); *G02F 1/157* (2013.01); *G02F 1/1533* (2013.01); *G02F 2001/133354* (2013.01); *G02F 2201/50* (2013.01)

(58) Field of Classification Search
 USPC .................................................. 359/265–275
 See application file for complete search history.

(56) References Cited

U.S. PATENT DOCUMENTS

| | | |
|---|---|---|
| 2013/0021561 A1 | 1/2013 | Ahn |
| 2015/0286091 A1 | 10/2015 | Zhang et al. |
| 2016/0033836 A1 | 2/2016 | Chen |

\* cited by examiner

DISPLAY PANEL, DISPLAY DEVICE AND MANUFACTURING METHOD THEREOF

CROSS REFERENCE TO RELATED APPLICATIONS

The present disclosure claims priority of the Chinese Patent Application with the Application No. 201710774145.0 filed Aug. 31, 2017, which is incorporated herein in the entire.

TECHNICAL FIELD

The present disclosure relates to the field of semiconductor technology, particularly to a display panel, a display device and a manufacturing method thereof.

BACKGROUND

Because of low power consumption, high image quality, small volume, and light weight, the Liquid Crystal Display (LCD) is popular and becomes the mainstream of current display. At present, the LCD is mainly a Thin Film Transistor (TFT) liquid crystal display in which a display panel usually includes a color filter substrate and a TFT array substrate which are arranged opposite to each other and a liquid crystal layer arranged therebetween.

SUMMARY

The disclosure provides a display panel, a display device and a manufacturing method thereof, so as to improve an effective display region of the display panel.

An embodiment of the disclosure provides a display panel, comprising a plurality of pixels arranged in an array, and a black matrix between every two adjacent pixels, wherein the display panel further comprises at least one display member displaying a preset color, and each of the at least one display member is arranged between two corresponding adjacent pixels on a side of the black matrix close to a light-outgoing surface of the display panel.

In some embodiments, an orthographic projection of each of the at least one display member on the light-outgoing surface of the display panel overlaps an orthographic projection of a corresponding part of the black matrix on the light-outgoing surface of the display panel.

In some embodiments, the plurality of pixels comprise a red pixel, a green pixel, and a blue pixel, and the at least one display member comprises a white display member.

In some embodiments, the display panel further comprises an array substrate and a color filter substrate arranged opposite to each other, and the at least one display member is located on a surface of the color filter substrate opposite to the array substrate.

In some embodiments, the color filter substrate comprises a first base substrate and a color filter layer arranged on a side of the first base substrate facing the array substrate, the color filter layer comprises a plurality of color filter blocks corresponding to the plurality of pixels one by one, and the black matrix is arranged between every two adjacent color filter blocks, and each of the at least one display member is arranged at a position corresponding to a corresponding part of the black matrix on a side of the first base substrate opposite to the array substrate.

In some embodiments, each of the at least one display members comprises a first electrode, an electrochromic layer and a second electrode successively arranged on the color filter substrate and the electrochromic layer displays the preset color when a preset voltage is applied between the first and second electrodes.

In some embodiments, orthographic projections of the first electrode, the electrochromic layer, and the second electrode on the color filter substrate overlap.

In some embodiments, the orthographic projection of the second electrode on the color filter substrate covers an orthographic projection of a gap between two pixels adjacent to the second electrode on the color filter substrate.

In some embodiments, each of the at least one display member further comprises a first conductive electrode arranged between the color filter substrate and the first electrode and contacting the first electrode, and the first conductive electrode extends along a row direction of the plurality of pixels, is arranged between two adjacent rows of pixels and connected with an end of the first electrode; and each of the at least one display member further comprises a second conductive electrode arranged on the second electrode and contacting the second electrode, and the second conductive electrode extends along the row direction of the plurality of pixels, is arranged between two adjacent rows of pixels and connected with an end of the second electrode.

In some embodiments, the display panel further comprises at least one pixel group successively arranged in a direction extending along the row direction of the plurality of pixels, and each of the at least one pixel group comprises a red pixel, a green pixel, a blue pixel which are adjacent, and the first and/or second conductive electrodes of three display members corresponding to the red pixel, the green pixel and the blue pixel in each of the at least one pixel group are formed integrally.

In some embodiments, a packaging protection layer is provided on the second conductive electrode.

In some embodiments, a material of the electrochromic layer is an inorganic electrochromic material or an organic electrochromic material.

In some embodiments, a material of the electrochromic layer is electronic ink.

The present disclosure further provides a display device comprising the above display panel.

The present disclosure further provides a manufacturing method of a display panel, wherein the display panel comprises a plurality of pixels arranged in an array and a black matrix between every two adjacent pixels, wherein the manufacturing method comprises: forming at least one display member displaying a preset color such that each of the at least one display member is arranged between two corresponding adjacent pixels on a side of the black matrix close to a light-outgoing surface of the display panel.

In some embodiments, before forming at least one display member displaying a preset color such that each of the at least one display member is arranged between two corresponding adjacent pixels on a side of the black matrix close to a light-outgoing surface of the display panel, the manufacturing method further comprises:

forming an array substrate;

forming a color filter substrate such that the color filter substrate comprises a plurality of color filter blocks corresponding to the plurality of pixels one by one, and the black matrix between every two adjacent color filter blocks; and aligning and assembling the array substrate and the color filter substrate;

wherein forming at least one display member displaying a preset color such that each of the at least one display member is arranged between two corresponding adjacent pixels on a side of the black matrix close to a light-outgoing surface of the display panel comprises forming the at least one display member on a surface of the color filter substrate opposite to the array substrate.

In some embodiments, before forming at least one display member displaying a preset color such that each of the at least one display members is arranged between two corresponding adjacent pixels on a side of the black matrix close to a light-outgoing surface of the display panel, the manufacturing method further comprises:

forming an array substrate;

forming a color filter substrate;

wherein forming at least one display member displaying a preset color such that each of the at least one display members is arranged between two corresponding adjacent pixels on a side of the black matrix close to a light-outgoing surface of the display panel comprises forming the at least one display member on a surface of the color filter substrate opposite to the array substrate, and after forming the at least one display member on a surface of the color filter substrate opposite to the array substrate, the manufacturing method further comprises: aligning and assembling the array substrate and the color filter substrate.

In some embodiments, forming the at least one display member on a surface of the color filter substrate opposite to the array substrate comprises successively forming a first electrode, an electrochromic layer, and a second electrode on the surface of the color filter substrate opposite to the array substrate such that orthographic projections of the first electrode, the electrochromic layer, and the second electrode on the color filter substrate overlap an orthographic projection of a corresponding part of the black matrix on the color filter substrate.

In some embodiments, before forming a first electrode on the surface of the color filter substrate opposite to the array substrate, the manufacturing method further comprises: forming a first conductive electrode on a surface of the color filter substrate opposite to the array substrate such that the first conductive electrode extends along a row direction of the plurality of pixels, is arranged between two adjacent rows of pixels and connected with an end of the first electrode;

after forming a second electrode on the surface of the color filter substrate opposite to the array substrate, the manufacturing method further comprises forming a second conductive electrode on the second electrode such that the second conductive electrode extends along the row direction of the plurality of pixels, is arranged between the two adjacent rows of pixels and connected with an end of the second electrode.

BRIEF DESCRIPTION OF DRAWINGS

The accompanying drawings are used to provide further understanding of this disclosure, and to form a part of the description, and to interpret this disclosure along with the following detail description of embodiments, but not to limit this disclosure. In the accompanying drawings.

DETAILED DESCRIPTION OF THE EMBODIMENTS

Figure 1:
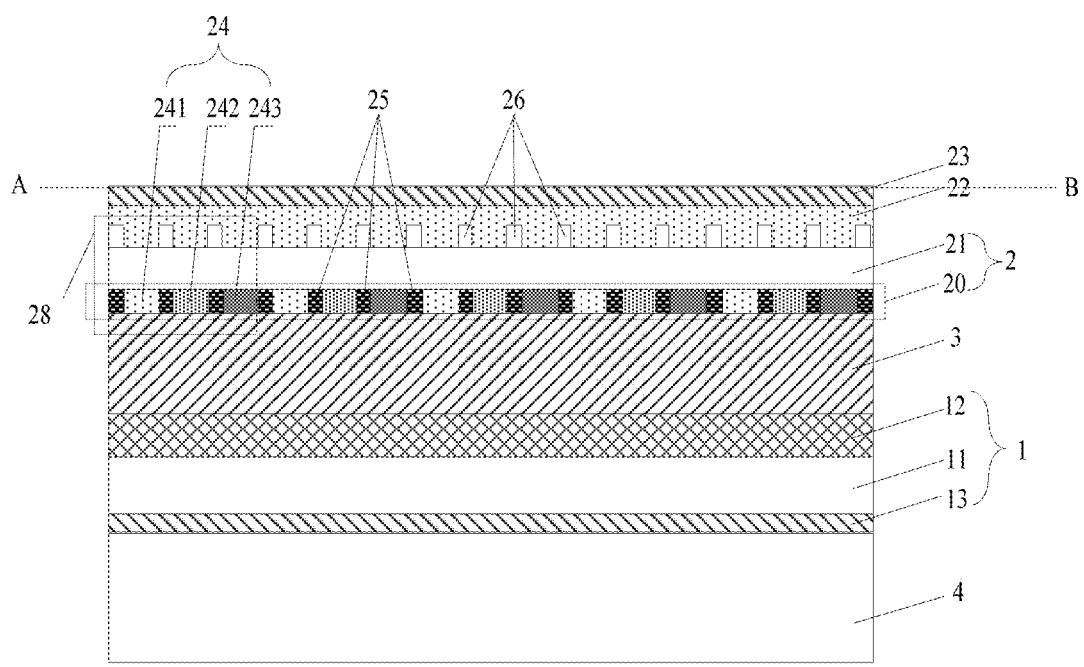
FIG. 1 is a cross-sectional view of a structure of a display panel provided by embodiments of the present disclosure.

Next, embodiments of the present disclosure will be described in detail in conjunction with the accompanying drawings, in which same or similar elements or elements having same or similar functions are denoted by same or similar reference numerals throughout. The following embodiments described with reference to the drawings are exemplary, and are only for interpreting the disclosure, but not for limiting the present disclosure.

In the liquid-crystal display in the prior art, a plurality of color filter blocks are usually arranged on the side of the color filter substrate facing the liquid crystal layer corresponding to the pixels one by one, to convert light of the backlight source into light of different colors. And the black matrix is usually arranged between adjacent pixels, that is, the display panel includes the pixel for displaying images and the black matrix between the adjacent pixels, and not all of the regions of the display panel are used for displaying. There is a problem of a low efficient display region.

Referring to FIG. 1, embodiments of the present disclosure provide a display panel, including a plurality of pixels 24 arranged in an array, and a black matrix 25 arranged between every two adjacent pixels 24. Herein, the pixel 24 may be a red pixel 241 displaying red color, a green pixel 242 displaying green color, or a blue pixel 243 displaying blue color. The display panel also includes at least one display member 26 displaying a preset color, and each of the at least one display member 26 is arranged between two corresponding adjacent pixels 24 on a side of the black matrix 25 close to the light-outgoing surface of the display panel. In FIG. 1, it shows that the display member 26 displaying a preset color is arranged in a gap between two adjacent pixels 24 in any row of pixels, the display member 26 is located on one side of the black matrix 25 close to the light-outgoing surface AB of the display panel.

In some embodiments, other parts of the display panel except the display member 26 may be exactly the same as those of a liquid crystal display panel in the prior art in structure, that is, the display panel may include a backlight module 4 and a liquid crystal cell above the backlight module 4. Particularly, the display panel includes an array substrate 1 and a color filter substrate 2, and a liquid crystal layer 3 arranged between the array substrate 1 and the color filter substrate 2. Particularly, the color filter substrate 2 may include a first base substrate 21 and a color filter layer 20 arranged on a surface of the first base substrate 21 facing the array substrate 1, and the color filter layer 20 includes a plurality of color filter blocks corresponding to the pixels 24 one by one (for example, the red color filter block corresponding to the red pixel 241, the green color filter block corresponding to the green pixel 242 and the blue color filter block corresponding to the blue pixel 243). A black matrix 25 is also arranged between every two adjacent color filter blocks. Optically clear adhesive (OCA) 22 may be further arranged on the display member 26, and an upper polarizer 23 may be further arranged on the Optically Clear Adhesive 22. The array substrate 1 may include a second base substrate 11, a thin film transistor layer 12 arranged on a surface of the second base substrate 11 facing the liquid crystal layer 3, and a lower polarizer 13 arranged on a surface of the second base substrate 11 opposite to the liquid crystal layer. In order to not affect the manufacturing of other layers of the color filter substrate, the display member 26 may be arranged on a surface of the color filter substrate 2 opposite to the array substrate 1, and located in the gap between every two adjacent pixels of each row of pixels. That is, an orthographic projection of the display member 26 on the light-outgoing surface of the display panel overlaps the black matrix 25 in the row where the display member is located on the light-outgoing surface of the display panel.

In some embodiments of the present disclosure, the display member displaying a preset color is arranged in the gap region between every two adjacent pixels in any row of pixels.

Optionally, the display member may reflect ambient light directly without need of the backlight source, such that the gap region between the adjacent pixels of the display panel may also participate in the display. Further, the effective display region of the display panel may be improved, and the display member displaying the preset color is arranged between the adjacent pixels in any row of pixels, which may make the display panel display more colors, and make the display smoother for achieving natural-color display.

Particularly, the display member may include a first electrode, an electrochromic layer, and a second electrode successively arranged on the color filter substrate, and the electrochromic layer displays the preset color when a preset voltage is applied between the first and the second electrodes. Particularly, the orthographic projection of the second electrode on the color filter substrate overlaps with the orthographic projection of the electrochromic layer on the color filter substrate, the orthographic projection of the second electrode on the color filter substrate also overlaps with the orthographic projection of the first electrode on the color filter substrate, and the orthographic projection of the second electrode on the color filter substrate covers the orthographic projection of a gap between the pixels adjacent to the second electrode on the color filter substrate. Particularly, the first electrode may be made of indium tin oxide (ITO) or graphene with high transmittance. For example, considering the connection of process, the first electrode is made of indium tin oxide. Particularly, the second electrode may be made of indium tin oxide or graphene with high transmittance, for example, considering the connection of process, the second electrode is made of indium tin oxide. The electrochromic layer has reversible color change characteristics subjected to a lower driving voltage or current applied thereon, which refers to reversible change in valence state and material component, such that optical properties of the material will change or maintain changing, and the electrochromic material also needs good ionic conductivity, higher contrast, discoloration efficiency, cycle period and other electrochromic characteristics. Particularly, an electrochromic material may be an inorganic or organic electrochromic material. The inorganic electrochromic material may be tungsten trioxide, for example. At present, an electrochromic device with tungsten trioxide as a functional material has been already industrialized. And the organic electrochromic material may be polythiophene and its derivatives, viologen, tetrathiafulvalene, metallo phthalocyanines-type compound and the like. The electrochromic material of vionlogen as the functional material has already been applied in practice. Certainly, the material of the electrochromic layer in the embodiment of this disclosure may also be electronic ink which has been well known.

Figure 2:
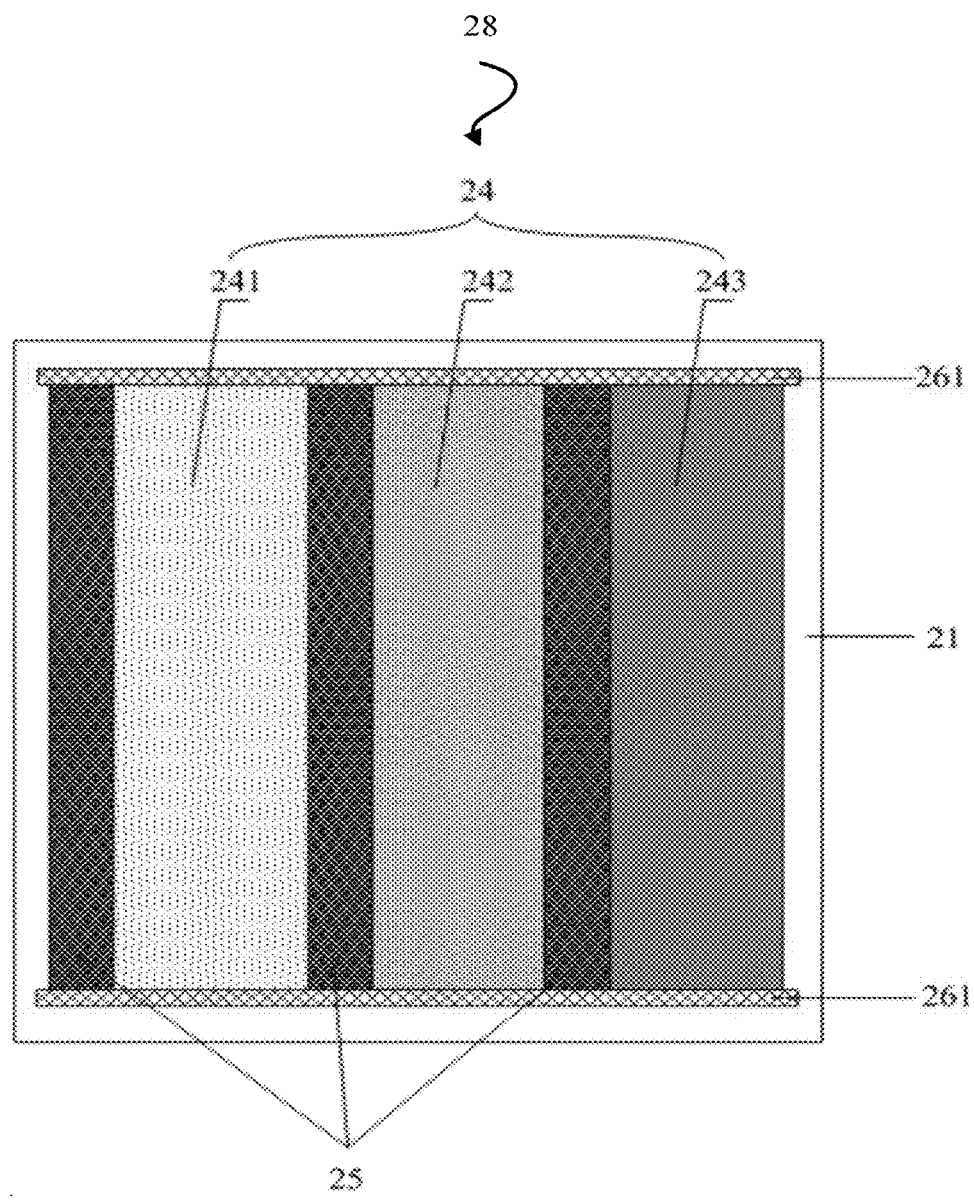
FIG. 2 is a schematic diagram of a vertical enlarged structure of a region where three adjacent pixels are located in the embodiments of the present disclosure.

FIG. 2 is a schematic diagram of a vertical enlargement structure of a region (such as the dashed line box 28 in FIG. 1) where three adjacent pixels are located in FIG. 1. Each display member 26 is arranged on a first base substrate 21 of the color filter substrate, and further includes two first conductive electrodes 261 arranged between the color filter substrate and the first electrode 262 and contacting with the first electrode 262. Each first conductive electrode 261 extends along a row direction of the pixels, and is arranged between two adjacent rows of pixels, and connected with an end of the first electrode 262. Each display member further includes a second conductive electrode arranged on the second electrode and contacting with the second electrode (not shown in FIG. 2), and the second conductive electrode extends along the row direction of the pixels, and is arranged between two adjacent rows of pixels, and connected with an end of the second electrode. In addition, In some embodiments, in the case where the pixels include a red pixel, a green pixel and a blue pixel, the display member may be a white display member displaying white color. In a conventional display panel, successively adjacent three pixels of the red pixel, the green pixel and the blue pixel are usually used as a pixel group. Thus, correspondingly, In some embodiments of the present disclosure, see FIG. 2, the first conductive electrode 261 of the three display members corresponding to every three adjacent pixels (such as the red pixel 241, the green pixel 242 and the blue pixel 243 in the figure) is formed integrally. That is, the display member corresponding to every three adjacent pixels may be used as a display module to perform an independent display so as to match with color requirements of each pixel group. In some embodiments of this disclosure, the display member is a white display member for displaying white color, thus the display panel may increase brightness and achieve natural-color display. But, this disclosure is not limited thereto.

An embodiment of this disclosure further provides a display device, including the display panel provided by the embodiments of this disclosure.

An embodiment of this disclosure further provides a manufacturing method of a display panel in which the display panel includes a plurality of pixels arranged in an array and a black matrix between every two adjacent pixels. The manufacturing method of the display panel includes:

forming at least one display member displaying a preset color such that each of the at least one display member is arranged between two corresponding adjacent pixels on a side of the black matrix facing the light-outgoing surface of the display panel.

In some embodiments, the display member may be formed on a color filter substrate. Particularly, a color filter layer and the black matrix may be arranged on one surface of the color filter substrate. After forming the color filter substrate, the display member may be formed directly on the other surface of the color filter substrate; and it is also possible that, after aligning and assembling the color filter substrate and the array substrate, the display member is formed on a surface of the color filter substrate opposite to the array substrate. The following embodiment is illustrated in combination with an example in which a material of an electrochromic layer in the display member is electronic ink.

Figure 7:
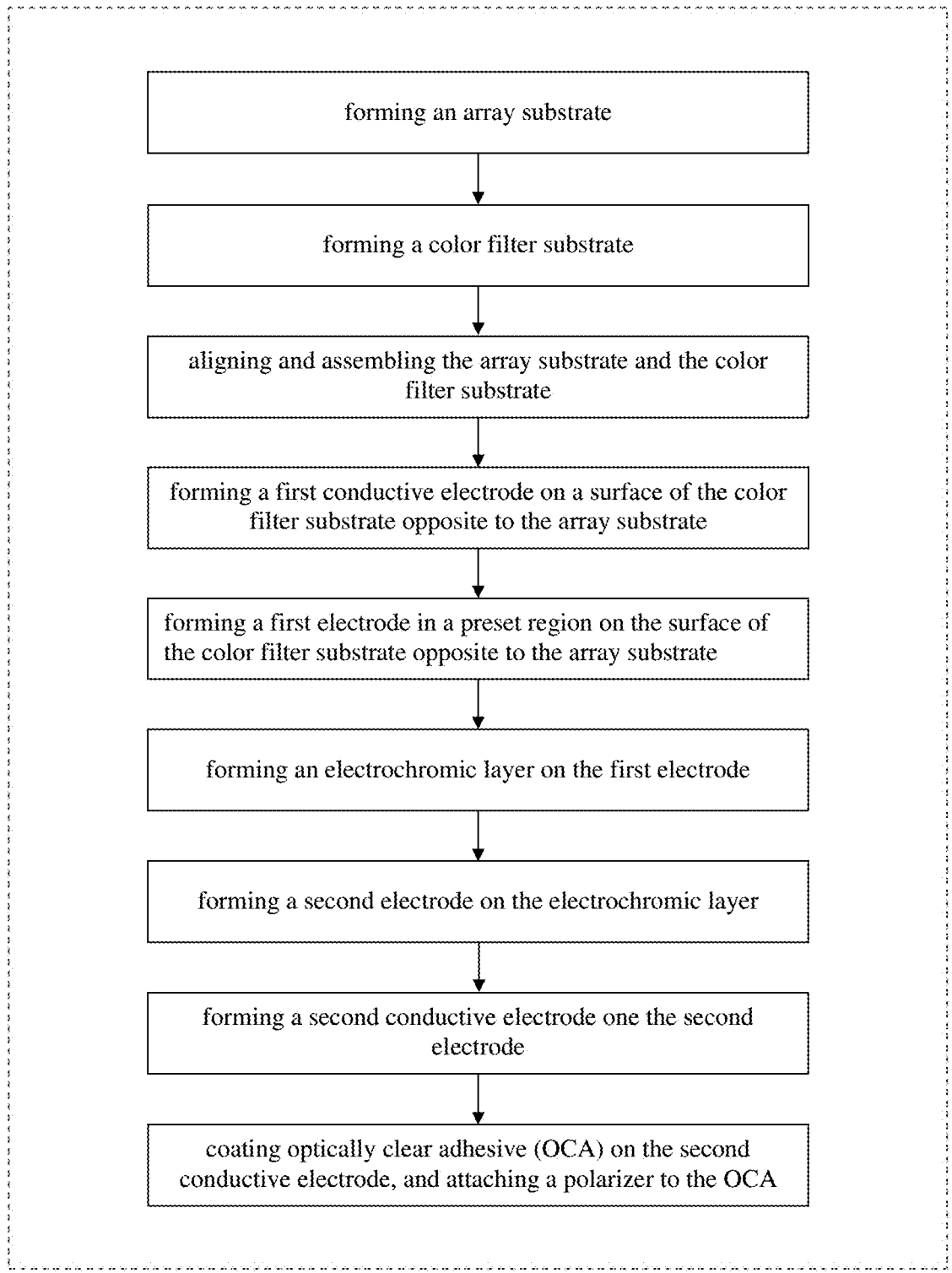
FIG. 7 is a flow chart illustrating a manufacturing method of the display panel of the embodiments of the present disclosure.

As shown in FIG. 7, an embodiment of the present disclosure provides a manufacturing method of a display panel, including step 1 to step 9.

At step 1, an array substrate is formed. The step for forming the array substrate is the same as that in a method for manufacturing an array substrate of a liquid crystal display panel in the prior art, which will not be described herein.

At step 2, a color filter substrate is formed. The color filter substrate is formed to include a plurality of color filter blocks corresponding to the plurality of pixels, and a black matrix between every two adjacent color filter blocks. The step for forming the color filter substrate may be the same as that in a method for manufacturing a color filter substrate of the liquid crystal display panel in the prior art, which will not be described herein.

At step 3, the array substrate and the color filter substrate are aligned and assembled such that the black matrix is located on a surface of the color filter substrate facing the array substrate.

Figure 3:
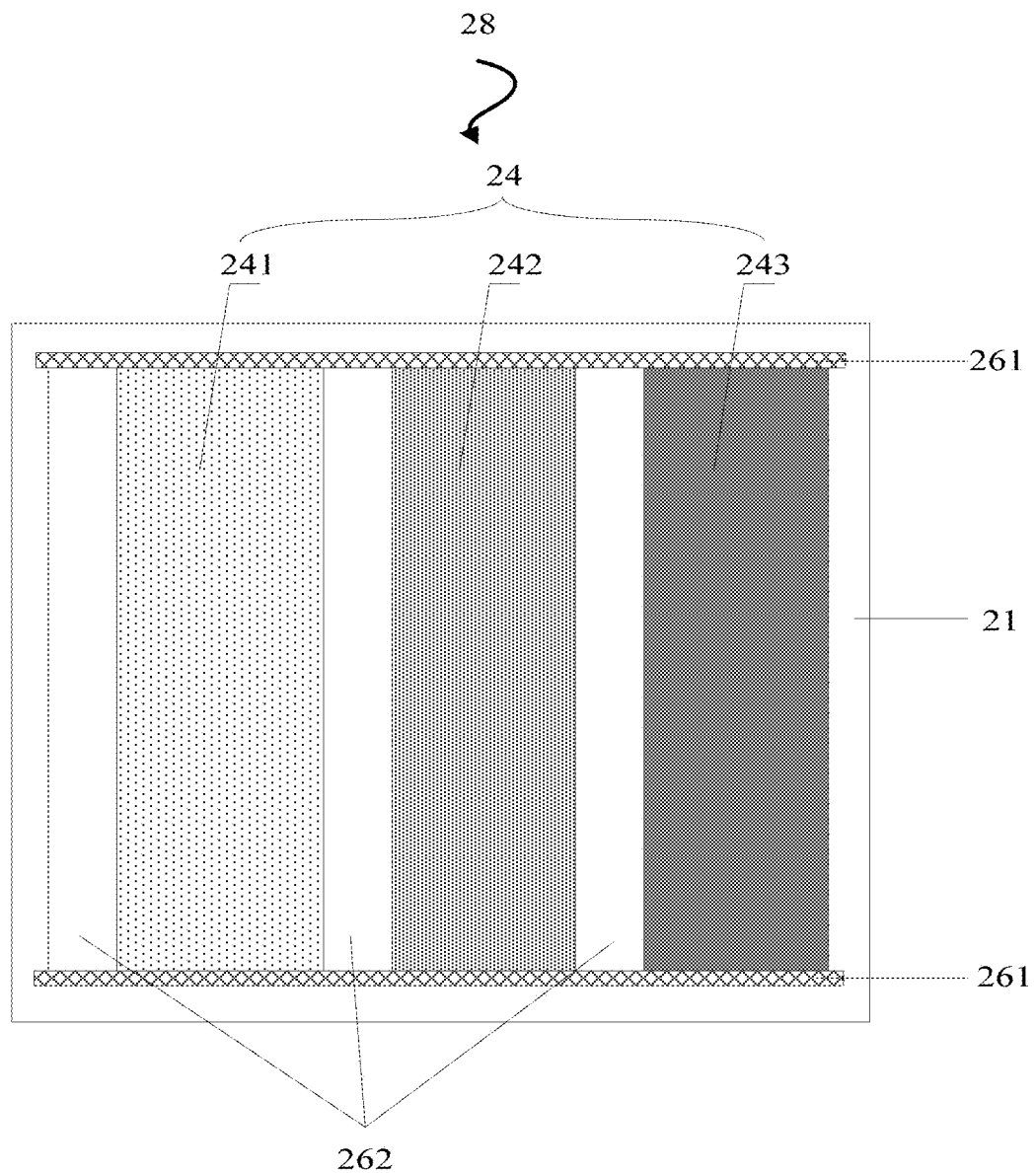
FIG. 3 is a schematic diagram of a structure provided with a first conductive electrode and a first electrode in the embodiments of the present disclosure.

At step 4, a first conductive electrode 261 is formed on a surface of the color filter substrate opposite to the array substrate such that the first conductive electrode 261 extends along a row direction of the pixels and is located between two adjacent rows of pixels. A schematic diagram of the structure formed with the first conductive electrode 261 is shown in FIG. 3.

At step 5, a first indium tin oxide electrode 262 is formed in a preset region on the surface of the color filter substrate opposite to the array substrate, and the preset region includes a gap region between every two adjacent pixels of each row of pixels. Herein, an end of the first indium tin oxide electrode 262 is connected to the first conductive electrode 261. The schematic diagram of the structure formed with the first Indium tin oxide electrode 262 is shown in FIG. 3.

Figure 4:
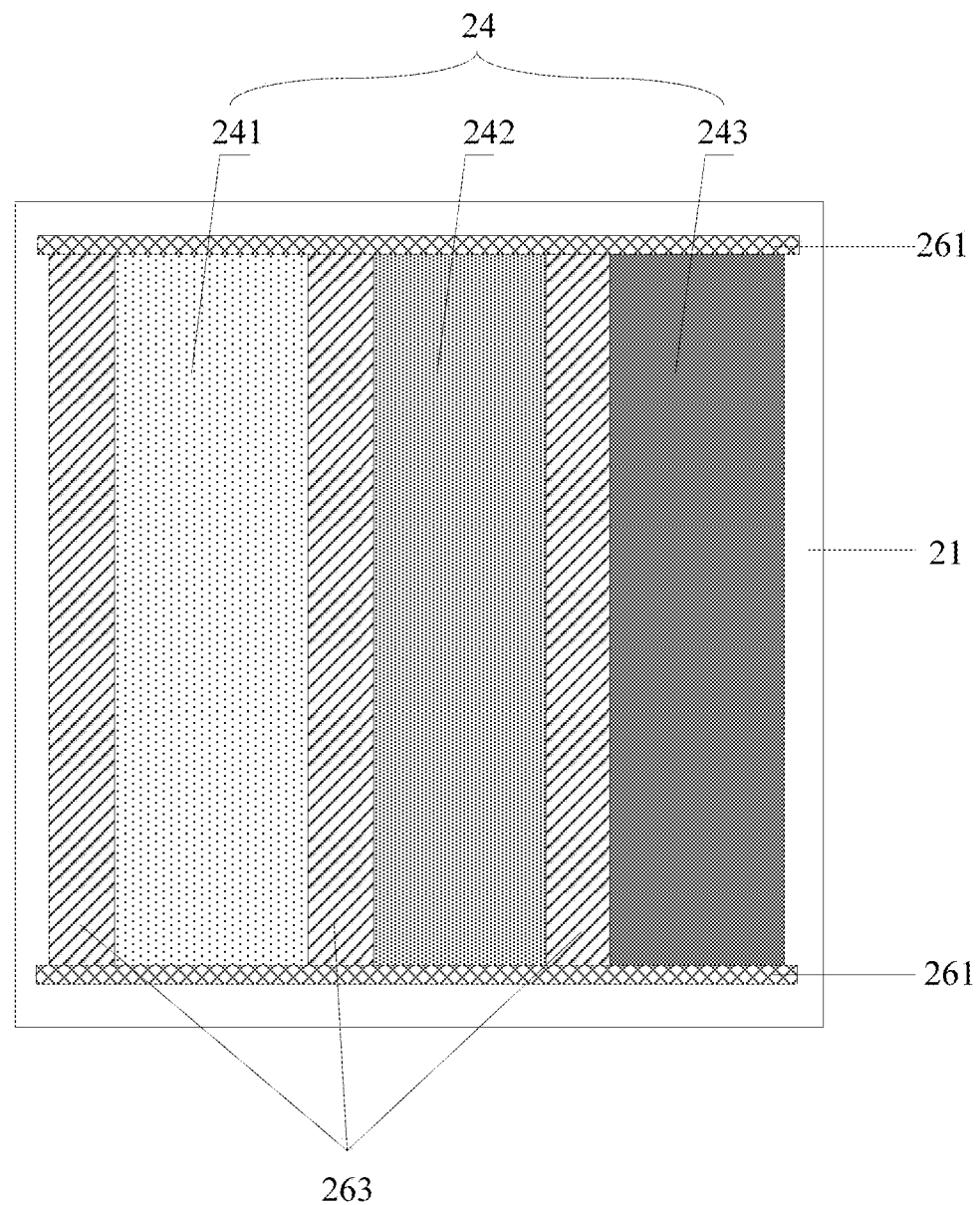
FIG. 4 is a schematic diagram of a structure provided with an electrochromic layer in the embodiments of the present disclosure.

At step 6, an electronic-ink electrochromic layer 263 is formed on the first indium tin oxide electrode 262. The schematic diagram of the structure formed with the electronic-ink electrochromic layer 263 is shown in FIG. 4.

Figure 5:
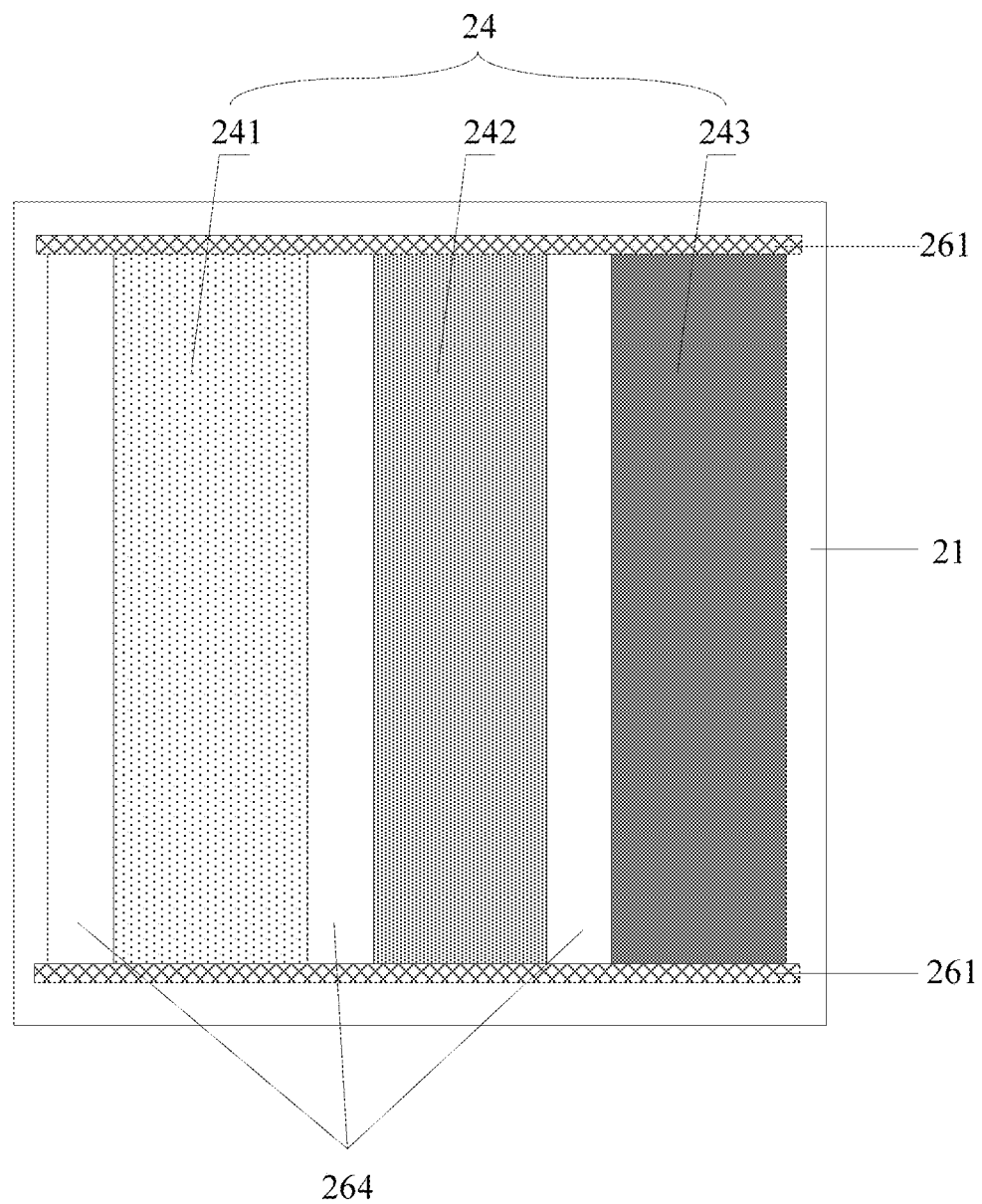
FIG. 5 is a schematic diagram of a structure provided with a second electrode in the embodiments of the present disclosure.

At step 7, a second indium tin oxide electrode 264 is formed on the electronic-ink electrochromic layer 263. The schematic diagram of the structure formed with the second indium tin oxide electrode 264 is shown in FIG. 5.

At step 8, a second conductive electrode 265 is formed on the second indium tin oxide electrode 264, and the second conductive electrode 265 extends along the row direction of the pixels, and is located between every two adjacent rows of pixels, and connected to an end of the second indium tin oxide electrode 264. The schematic diagram of the structure formed with the second conductive electrode 265 is shown in FIG. 6.

At step 9, optically clear adhesive (OCA) is coated on the second conductive electrode, and a polarizer is attached to the OCA. Certainly, after attaching the polarizer, a packaging protective layer of glass or PET may be further formed.

Figure 6:
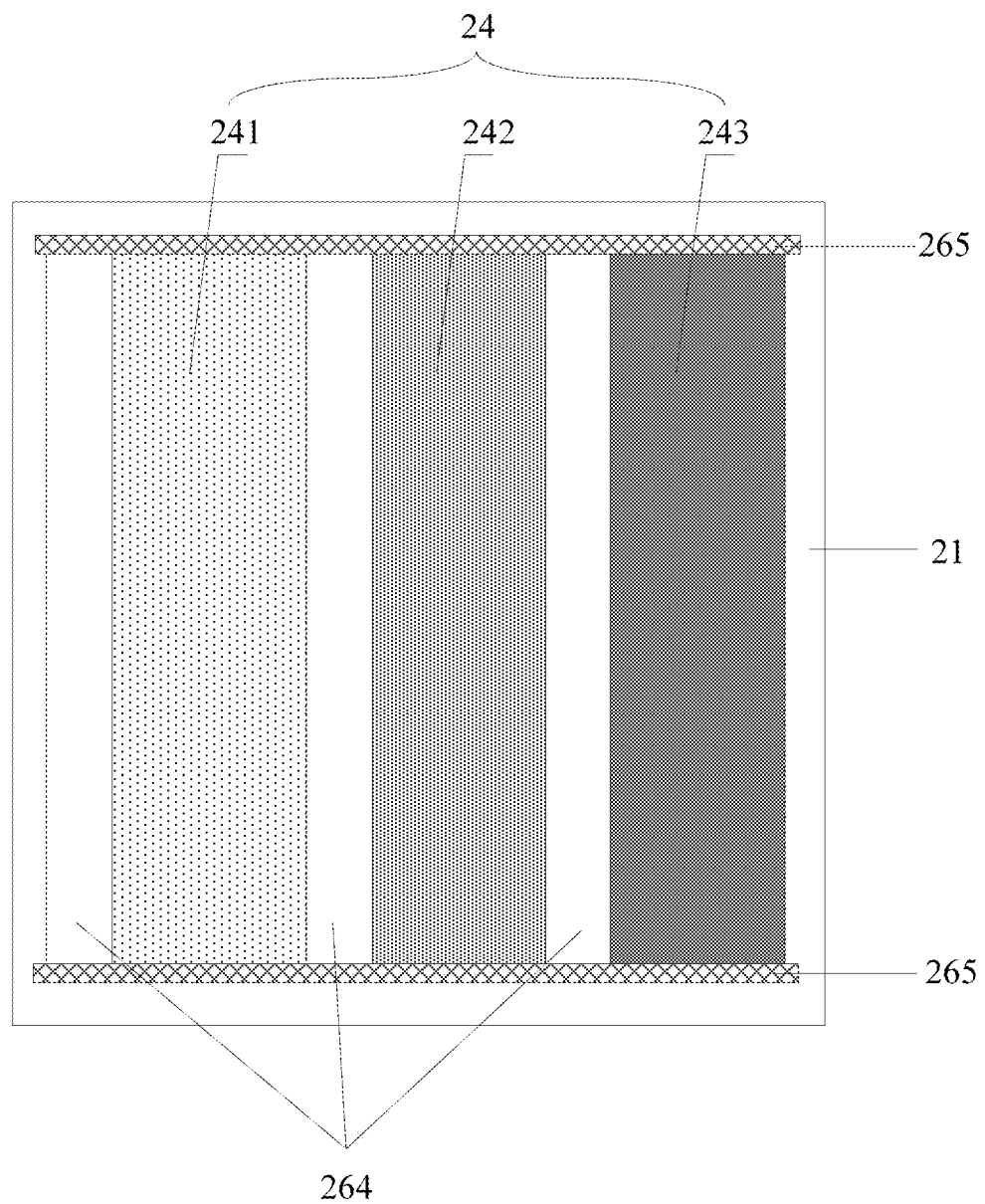
FIG. 6 is a schematic diagram of a structure provided with a second conductive electrode in the embodiments of the present disclosure.

Herein, every three adjacent pixels (for example, the red pixel 241, the green pixel 242, and the blue pixel 243 shown in FIG. 6) arranged along the row direction of the pixels are generally used as one pixel group. For one pixel group, as shown in FIG. 6, the first conductive electrode 261 is arranged at two ends of the pixel group as an integrated structure, and the corresponding second conductive electrode 265 is also an integrated structure and arranged opposite to the first conductive electrode 261.

Figure 8:
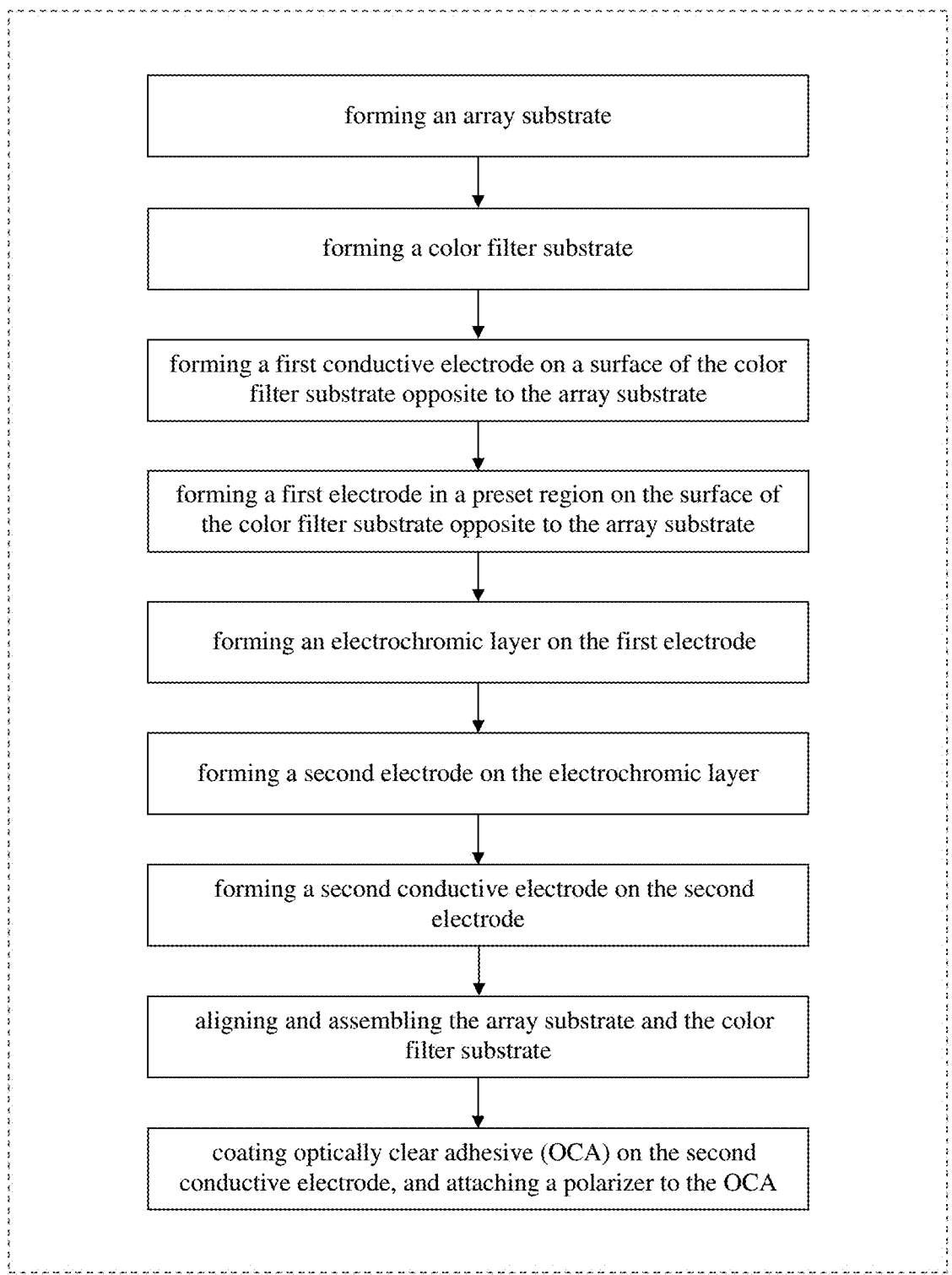
FIG. 8 is a flow chart illustrating a manufacturing method of the display panel of the embodiments of the present disclosure.

As shown in FIG. 8, an embodiment of the present disclosure provides a manufacturing method of a display panel, including step 1 to step 9:

At step 1, an array substrate is formed. The step for forming the array substrate is the same as that in a method for manufacturing an array substrate of a liquid crystal display panel in the prior art, which will not be described herein.

At step 2, a color filter substrate is formed. The color filter substrate is formed to include a plurality of color filter blocks corresponding to the plurality of pixels, and a black matrix between every two adjacent color filter blocks. The step for forming the color filter substrate may be the same as that in a method for manufacturing a color filter substrate of the liquid crystal display panel in the prior art, which will not be described herein.

At step 3, a first conductive electrode 261 is formed on a surface of the color filter substrate opposite to the array substrate such that the first conductive electrode 261 extends along a row direction of the pixels and is located between two adjacent rows of pixels. A schematic diagram of the structure formed with the first conductive electrode 261 is shown in FIG. 3.

At step 4, a first indium tin oxide electrode 262 is formed in a preset region on the surface of the color filter substrate opposite to the array substrate, and the preset region includes a gap region between every two adjacent pixels of each row of pixels. Herein, an end of the first indium tin oxide electrode 262 is connected to the first conductive electrode 261. The schematic diagram of the structure formed with the first Indium tin oxide electrode 262 is shown in FIG. 3.

At step 5, an electronic-ink electrochromic layer 263 is formed on the first indium tin oxide electrode 262. The schematic diagram of the structure formed with the electronic-ink electrochromic layer 263 is shown in FIG. 4.

At step 6, a second indium tin oxide electrode 264 is formed on the electronic-ink electrochromic layer 263. The schematic diagram of the structure formed with the second indium tin oxide electrode 264 is shown in FIG. 5.

At step 7, a second conductive electrode 265 is formed on the second indium tin oxide electrode 264, and the second conductive electrode 265 extends along the row direction of the pixels, and is located between every two adjacent rows of pixels, and connected to an end of the second indium tin oxide electrode 264. The schematic diagram of the structure formed with the second conductive electrode 265 is shown in FIG. 6.

At step 8, the array substrate and the color filter substrate are aligned and assembled such that the black matrix is located on a surface of the color filter substrate facing the array substrate.

At step 9, optically clear adhesive (OCA) is coated on the second conductive electrode, and a polarizer is attached to the OCA. Certainly, after attaching the polarizer, a packaging protective layer of glass or PET may be further formed.

The beneficial effects of the embodiments of the present disclosure are: by providing the at least one display member 26 displaying a preset color such that each of the display member 26 is arranged between two corresponding adjacent pixels 24 on a side of the black matrix 25 close to the light-outgoing surface of the display panel (for example, in FIG. 1, a display member displaying a preset color is arranged in the gap region between every two adjacent pixels 24 in any row of pixels), thereby the gap region between the adjacent pixels of the display panel may participate in the luminescent display, to increase the efficiency display region of the display panel.

Obviously, those skilled in the art may make various modifications and variants to this disclosure without departing from spirit and scope of this disclosure. As such, if these modifications and variants of this disclosure fall into the scope of the claims and the equivalences of the disclosure, the present disclosure intends to include these modifications and variants.

The invention claimed is:

1. A display panel, comprising a plurality of pixels arranged in an array, and a black matrix between every two adjacent pixels, wherein
the display panel further comprises at least one display member displaying a preset color, and each of the at least one display member is arranged between two corresponding adjacent pixels on a side of the black matrix close to a light-outgoing surface of the display panel.

2. The display panel as claimed in claim 1, wherein an orthographic projection of each of the at least one display member on the light-outgoing surface of the display panel overlaps an orthographic projection of a corresponding part of the black matrix on the light-outgoing surface of the display panel.

3. The display panel as claimed in claim 2, wherein the plurality of pixels comprise a red pixel, a green pixel, and a blue pixel, and the at least one display member comprises a white display member.

4. The display panel as claimed in claim 3, further comprising an array substrate and a color filter substrate arranged opposite to each other, wherein the display member is located on a surface of the color filter substrate opposite to the array substrate.

5. The display panel as claimed in claim 4, wherein the color filter substrate comprises a first base substrate and a color filter layer arranged on a side of the first base substrate facing the array substrate, the color filter layer comprises a plurality of color filter blocks corresponding to the plurality of pixels one by one, and the black matrix is arranged between every two adjacent color filter blocks, and each of the at least one display member is arranged at a position corresponding to a corresponding part of the black matrix on a side of the first base substrate opposite to the array substrate.

6. The display panel as claimed in claim 5, wherein each of the at least one display members comprises a first electrode, an electrochromic layer and a second electrode successively arranged on the color filter substrate and the electrochromic layer displays the preset color when a preset voltage is applied between the first and second electrodes.

7. The display panel as claimed in claim 6, wherein orthographic projections of the first electrode, the electrochromic layer, and the second electrode on the color filter substrate overlap.

8. The display panel as claimed in claim 7, wherein the orthographic projection of the second electrode on the color filter substrate covers an orthographic projection of a gap between two pixels adjacent to the second electrode on the color filter substrate.

9. The display panel as claimed in claim 8, wherein,
each of the at least one display member further comprises a first conductive electrode arranged between the color filter substrate and the first electrode and contacting the first electrode, and the first conductive electrode extends along a row direction of the plurality of pixels, is arranged between two adjacent rows of pixels and connected with an end of the first electrode; and
each of the at least one display member further comprises a second conductive electrode arranged on the second electrode and contacting the second electrode, and the second conductive electrode extends along the row direction of the plurality of pixels, is arranged between two adjacent rows of pixels and connected with an end of the second electrode.

10. The display panel as claimed in claim 9, further comprising at least one pixel group successively arranged in a direction extending along the row direction of the plurality of pixels, wherein each of the at least one pixel group comprises a red pixel, a green pixel, a blue pixel which are adjacent, and the first and/or second conductive electrodes of three display members corresponding to the red pixel, the green pixel and the blue pixel in each of the at least one pixel group are formed integrally.

11. The display panel as claimed in claim 9, wherein a packaging protection layer is provided on the second conductive electrode.

12. The display panel as claimed in claim 6, wherein a material of the electrochromic layer is an inorganic electrochromic material or an organic electrochromic material.

13. The display panel as claimed in claim 6, wherein a material of the electrochromic layer is electronic ink.

14. A display device, comprising the display panel as claimed in claim 1.

15. A manufacturing method of a display panel, wherein the display panel comprises a plurality of pixels arranged in an array and a black matrix between every two adjacent pixels, wherein the manufacturing method comprises:
forming at least one display member displaying a preset color such that each of the at least one display member is arranged between two corresponding adjacent pixels on a side of the black matrix close to a light-outgoing surface of the display panel.

16. The manufacturing method as claimed in claim 15, wherein,
before forming at least one display member displaying a preset color such that each of the at least one display member is arranged between two corresponding adjacent pixels on a side of the black matrix close to a light-outgoing surface of the display panel, the manufacturing method further comprises:
forming an array substrate;
forming a color filter substrate such that the color filter substrate comprises a plurality of color filter blocks corresponding to the plurality of pixels one by one, and the black matrix between every two adjacent color filter blocks; and
aligning and assembling the array substrate and the color filter substrate;
wherein forming at least one display member displaying a preset color such that each of the at least one display member is arranged between two corresponding adjacent pixels on a side of the black matrix close to a light-outgoing surface of the display panel comprises forming the at least one display member on a surface of the color filter substrate opposite to the array substrate.

17. The manufacturing method as claimed in claim 16, wherein forming the at least one display member on a surface of the color filter substrate opposite to the array substrate comprises successively forming a first electrode, an electrochromic layer, and a second electrode on the surface of the color filter substrate opposite to the array substrate such that orthographic projections of the first electrode, the electrochromic layer, and the second electrode on the color filter substrate overlap an orthographic projection of a corresponding part of the black matrix on the color filter substrate.

18. The manufacturing method as claimed in claim 17, wherein
before forming a first electrode on the surface of the color filter substrate opposite to the array substrate, the manufacturing method further comprises: forming a first conductive electrode on a surface of the color filter substrate opposite to the array substrate such that the first conductive electrode extends along a row direction of the plurality of pixels, is arranged between two adjacent rows of pixels and connected with an end of the first electrode;
after forming a second electrode on the surface of the color filter substrate opposite to the array substrate, the manufacturing method further comprises forming a second conductive electrode on the second electrode such that the second conductive electrode extends along the row direction of the plurality of pixels, is arranged between the two adjacent rows of pixels and connected with an end of the second electrode.

19. The manufacturing method as claimed in claim 15, wherein,
before forming at least one display member displaying a preset color such that each of the at least one display members is arranged between two corresponding adjacent pixels on a side of the black matrix close to a light-outgoing surface of the display panel, the manufacturing method further comprises:
forming an array substrate;
forming a color filter substrate;
wherein forming at least one display member displaying a preset color such that each of the at least one display members is arranged between two corresponding adjacent pixels on a side of the black matrix close to a light-outgoing surface of the display panel comprises forming the at least one display member on a surface of the color filter substrate opposite to the array substrate, and
after forming the at least one display member on a surface of the color filter substrate opposite to the array substrate, the manufacturing method further comprises: aligning and assembling the array substrate and the color filter substrate.

20. The manufacturing method as claimed in claim 19, wherein forming the at least one display member on a surface of the color filter substrate opposite to the array substrate comprises successively forming a first electrode, an electrochromic layer, and a second electrode on the surface of the color filter substrate opposite to the array substrate such that orthographic projections of the first electrode, the electrochromic layer, and the second electrode on the color filter substrate overlap an orthographic projection of a corresponding part of the black matrix on the color filter substrate.

* * * * *